United States Patent [19]
Iwashita et al.

[11] 4,034,388
[45] July 5, 1977

[54] FILM TRANSPORT DRIVING AND BRAKING APPARATUS FOR A PHOTOGRAPHIC CAMERA

[75] Inventors: Tomonori Iwashita, Chofu; Susumu Kozuki, Yokahama, both of Japan

[73] Assignee: Canon Kabushiki Kaisha, Tokyo, Japan

[22] Filed: June 5, 1975

[21] Appl. No.: 583,971

[30] Foreign Application Priority Data

June 7, 1974 Japan ............................. 49-64708

[52] U.S. Cl. ............................... 354/173; 354/203; 354/212
[51] Int. Cl.² ........................................... G02B 1/24
[58] Field of Search .......... 354/171, 172, 173, 174, 354/203, 212, 213; 352/14, 78, 182, 159; 242/71, 71.2; 226/114, 195

[56] References Cited

UNITED STATES PATENTS

| 3,448,668 | 6/1969 | Nomura et al. | 354/173 |
| 3,529,890 | 9/1970 | Buon | 352/78 R |
| 3,537,780 | 11/1970 | Angenieux | 352/78 R |
| 3,604,790 | 9/1971 | Land | 352/78 R |
| 3,762,291 | 10/1973 | Kimura et al. | 354/171 |
| 3,867,021 | 2/1975 | Mueller et al. | 352/78 R |
| 3,923,386 | 12/1975 | Scholz | 352/72 |

Primary Examiner—L. T. Hix
Assistant Examiner—Alan Mathew
Attorney, Agent, or Firm—Toren, McGeady and Stanger

[57] ABSTRACT

In a roll film camera combined with a long length film magazine detachably mounted on the rear of the camera body, a film contained in the supply spool in the magazine is pulled past an exposure aperture by an intermittent-drive film advancing sprocket, while the take up spool in the magazine is driven by a separate driving means through a slip clutch to take up the film advanced from the sprocket. In one embodiment, this arrangement is provided with a film guiding means having buffering and braking functions mounted in the magazine and positioned between the sprocket and the take up spool so that when the sprocket is stopped while the separate driving means is driving the take up spool, the film is brought into frictional engagement with the surface of the film guiding means, whereby the film is braked and stabilized from residual movement during exposure.

5 Claims, 7 Drawing Figures

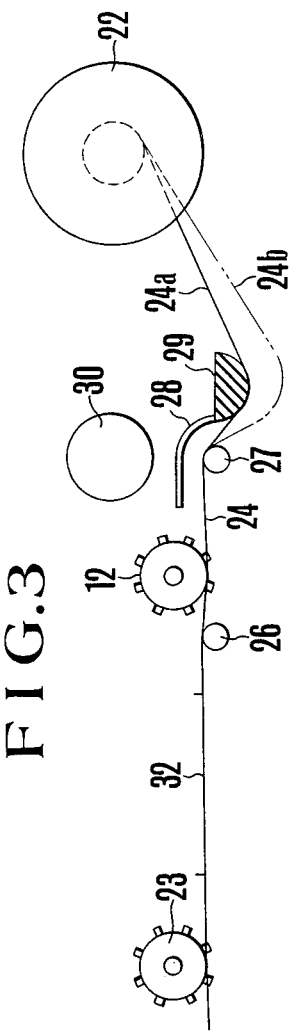
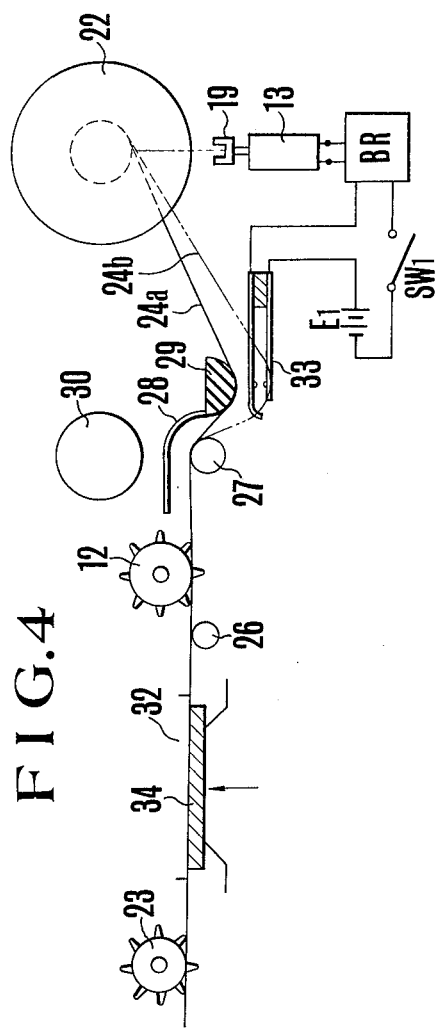

FILM TRANSPORT DRIVING AND BRAKING APPARATUS FOR A PHOTOGRAPHIC CAMERA

BACKGROUND OF THE INVENTION

This invention relates to photographic cameras, and more particularly to a film transport driving and braking system in a camera with a long length film magazine.

Many film transport driving and braking systems which have found their uses in combination with a camera and a long lenght film magazine provide a means for electrically or mechanically controlling synchronized intermittent operations of two separate driving means, one of which is connected to the film advancing means including a sprocket in the camera, and the other of which is connected to the take up spool in the magazine, whereby the sprocket and the take up spool are driven for rotation in a period of time between the successive exposures. In application to a particular photography where a number of exposures have to be continuously made at a high frequency, various problems have been encountered by the above mentioned systems. For example, the reliability of the electrical control means is rapidly decreased as the frequency of exposures increases. On the other hand, in the case of the mechanical control means, it is made more difficult to establish the predetermined synchronization between the operations of the two separate driving means with a sufficiently high accuracy, thereby resulting in an increase of tension exerted on the film between the sprocket and the take up spool, and formation of a slack of loose film therebetween. Such an increased tension will cause residual movement of the film during exposure, or damage the film, while such a film slack tends to engage with the take up spool in the camera body so that the film transport control is made impossible.

In addition to the above mentioned drawbacks, there is another drawback that the diameter of the film coil on the take up spool is increased as the film is transported from the supply to the take up spool, thereby the increased inertia of the take up spool move the film through a distance equal to the difference between the longitudinal lengths of the sprocket tooth and the perforation of the film, when the sprocket is stopped. As a result, the probability of recording indistinct images on the film is increased when the shutter is actuated just after the tranmission of a driving torque to the take up spool is terminated.

SUMMARY OF THE INVENTION

An object of the present invention is to eliminate the above mentioned conventional drawbakcs and to provide a novel film transport system for use in combination with a roll film camera with a long length film magazine detachably mounted on the rear of the camera body.

Another object of the present invention is to provide a film transport system in which when the intermittent-drive film advancement is stopped, no residual movement is imparted to the film behind the exposure aperture despite of the fact that a winding torque is being imparted to the take up spool in the magazine.

Still another object of the present invention is to provide a film transport system in which the film advanced from the sprocket in the camera body is taken up by the magazine side take up spool without causing the advanced film to be caught by the camera side take up spool positioned adjacent the film path between the sprocket and the magazine side take up spool and further without causing an excessive slack to occur in the film therebetween.

A furher object of the present invention is to provide a film transport system in which at the moment the slack is eliminated, an increased tension exerted on the film between the sprocket and the magazine side take up spool is absorbed so as not to impart residual movement to the film behind the exposure aperture.

To achieve these objects, according to one embodiment of the present invention, the film transport system is provided with a relatively simplified, low-cost resilient film guiding means having a frictional surface formed in a portion thereof mounted in the magazine and positioned between the camera side take up spool and the film path between the film advancing means in the camera body and the take up spool in the magazine, so that when an intermittent drive film advancement is stopped while a separate driving means is driving the magazine side take up spool, the film is brought into frictional engagement with the frictional surface of said film guiding means, whereby the film is braked and stabilized from residual movement before initiation of an exposure.

According to another embodiment of the present invention, the film transport driving and braking system of the character described above is further provided with a film detecting means positioned on the opposite side of the film path to the film guiding means in alignment with the frictional surface thereof and connected to control means for the driving means of the take up spool so that upon attainment of the length of a film slack to a predetermined level, the driving means is actuated to drive the take up spool.

Other objects, advantages and features of the present invention will become apparent from the following detailed description taken in conjunction with the accompanying drawings in which:

BRIEF DESCRIPTION OF THE DRAWINGS

FIG. 3 is a schematic diagram showing operating principles of the system of FIG. 2.

FIG. 4 is a similar diagram showing operating principles of another embodiment of the present invention.

DETAILED DESCRIPTION OF THE PREFERRED EMBODIMENTS

Figure 1:
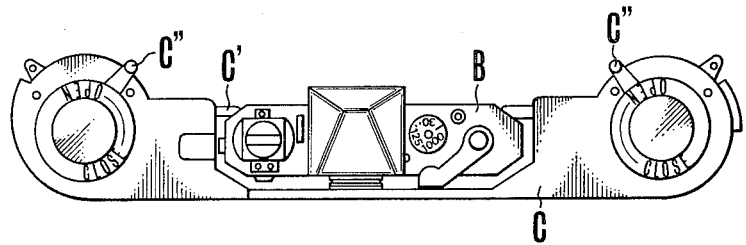
FIG. 1 is a top view of a roll film camera body with a long length film magazine.

In FIG. 1, there is shown a roll film camera having a body B in combination with a long length film magazine having a film chamber C as removably attached to the camera body B from the rear thereof and fixedly secured to the camera body B by means of a pair of detent pins C' extending from the magazine chamber C and arranged to be retractable by action of respective operable levers C''.

Figure 2:
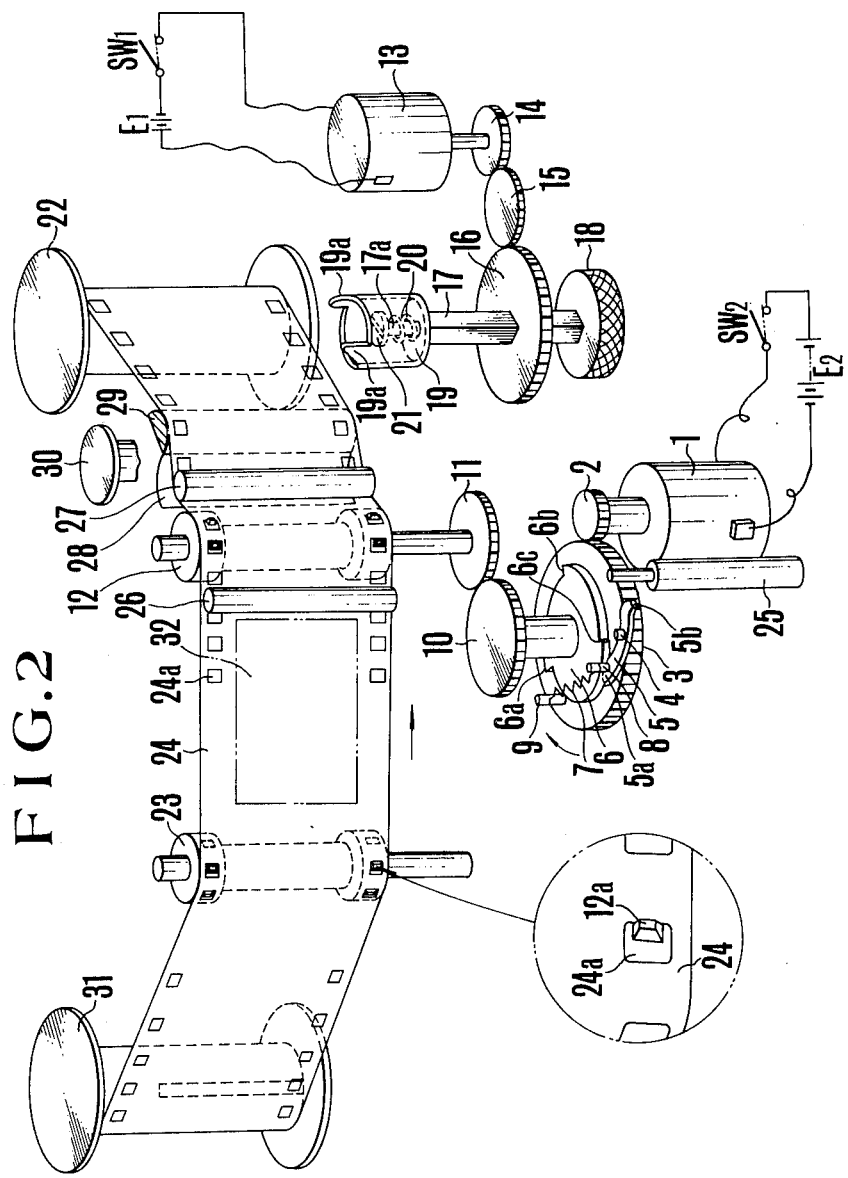
FIG. 2 is an exploded perspective view of the essential parts of one embodiment of a film transport driving and braking system according to the present invention usuable in the combination of the camera and magazine of FIG. 1.

Referring now to FIGS. 2 and 3, there is shown the essential parts of a film transport driving and braking apparatus in the combination of the camera and magazine of FIG. 1 without the housing thereof. A film 24 convoluted on a supply spool 31 in the magazine chamber C is pulled past an idle sprocket 23 and an exposure aperture 32 by action of a film advancing sprocket 12 intermittently driven by first driving means including an electric motor 1, while a take up spool 22 in the magazine chamber C is continuously driven by second driving means including an electric motor 13 through a slip clutch to take up the film advanced from sprocket 12. The first driving means comprises the electric motor 1 of which the winding is connected through a switch $Sw_2$ to a battery $E_2$, and a drive transmission responsive to the output of motor 1 for intermittently rotating the sprocket 12. This drive transmission comprises a gear 3 engaging a pinion 2 fixedly mounted on the output shaft of motor 1 and rotatably mounted in the housing of the camera body B, a clutch lever 5 which is fulcrumed at a pin 4 upwardly extending from gear 3 and which has an upwardly extending pin 8 located near the pawl end 5a thereof connected to one end of a spring 7 having the opposite end connected to a pin 9 extending from gear 3 and which tends to urge the pawl 5a of clutch lever 5 for peripheral engagement with a pawl disk 6 having three pawls 6a, 6b and 6c spaced from each other by an angle of 120° about its axis and rotatable with reference to gear 3 in axial alignment therewith, a gear 10 fixedly secured through a stud to the pawl disk 6 and engaging a gear 11 mounted on the shaft of sprocket 12, and a fixed pin 25 extending into the path of travel of the tail of clutch lever 5.

The second driving means comprises the motor 13 of which the winding is connected through a switch $Sw_1$ to a battery $E_1$, and a spool drive shaft 17 of a square cross-section connected through a gear train 14, 15 and 16 to the output shaft of motor 13 and having a manually operable knob 18 fixedly mounted on the bottom end thereof, the opposite or upper end of which carries an adapter 19 having a pair of teeth 19a arranged to be brought into engagement with a diametral rib of a take up spool core not shown when the take up spool 22 is loaded in the magazine chamber C. Positioned between the adapter 19 and the spool drive shaft 17 is a slip clutch comprising a compressed spring 20 and a small screw 21 fastened on the shaft 17 in axial alignment therewith.

The apparatus further includes a film guiding means comprising a film guide plate 28 positioned between the film path and the take up spool 30 of the camera body B and between the sprocket 12 and the magazine side take up spool 22, and a frictional resilient member 29 fixedly secured to the guide plate 28 and arranged so that when the sprocket 12 is stopped while the take up spool 22 is driven, the film 24 is brought from a position indicated at 24b in FIG. 3 into frictional engagement with the surface of the frictional resilient member 29, whereby the film 24 is braked in a position indicated at 24a and is stabilized from residual movement before initiation of an exposure. In this respect, it is preferred to constitute the member 29 with a foam rubber material. In order to insure that the film advanced through the length of exactly one frame each time the sprocket 12 is operated, there is provided a pair of rollers 26 and 27 positioned adjacent the film path as intervening the sprocket 12 from the opposite side of the film path to the sprocket 12.

The operation of the apparatus of FIG. 2 is as follows. The apparatus is now to be assumed in the cocked position where the pawl 5a of clutch lever 5 in the drive transmission is disengaged from any one of the disk pawls 6a, 6b and 6c. In order to make a continuous series of exposures at a high frequency, a shutter release button not shown is depressed to close both switches $Sw_1$ and $Sw_2$, thereby motors 1 and 13 are energized form their respective batteries $E_2$ and $E_2$ to rotate pinions 2 and 14. As the pinion 2 is rotated, the gear 3 is rotated in a clockwise direction to operate the shutter not shown while permitting the sprocket 12 to be held stationary. Each exposure is terminated before the gear 3 is rotated through an angular distance of 120° from the cocked position. After the engagement of the lever pawl 5a with the disk pawl 6a, the gear 3 is rotated through an angular distance of 240° together with the pawl disk 6, causing the sprocket 12 to advance the film 24 through the length of a frame past the exposure aperture 32, and simultaneously causing the camera cocking mechanism to operate through the intermediary including the gear 10. When the pawl 6a of the disk 6 has reached a position which was occupied by the pawl 6c before the shutter release button is depressed, the tail 5b of clutch lever 5 strikes the fixed pin 25 so that the pawl 5a of clutch lever 5 is disengaged from the pawl 6a against the force of spring 7, thereupon the camera is made ready for the next exposure.

On the other hand, in the magazine the driving torque of motor 13 is transmitted through the gear train 14, 15 and 16, spool drive shaft 17 and coupler 19 to the take up spool 22, so that the film advanced from sprocket 12 is taken up by the take up spool 22 after the advanced film is guided by the guide plate 28 and roller 27 while preventing the film from engaging with the camera side take up spool 30 which is being driven by motor 1 through a suitable intermediary. During the time when the film 24 is advanced by sprocket 12, the film 24 between the film guiding means 27, 28 and 29 assumes a position between the positions indicated at 24a and 24b in FIG. 3.

At the moment the lever pawl 5a is disengaged from the disk pawl 6a, the sprocket 12 is stopped without delay by a not shown arresting means to hold the film 24 in position. After that, the film between sprocket 12 and take up spool 22 is brought into frictional engagement with the frictional resilient member 29 as the take up spool 22 is rotated, thereby the film 24 is braked to stop at the position 24a without failure. This braking action is so effective that the transmission of motor 13 to the take up spool 22 is cut off at the slip clutch means 17a, and 20 and 21 to maintain the stopping condition of the take up spool 22 despite of the fact that motor 13 is energized for rotation, while the driving torque of motor 13 is absorbed by the resilient function of member 29 so as not to transfer any increased tension to that portion of the film beyond member 29. As a result, no residual movement is imparted to the film behind the exposure aperture during the exposure operation despite of the fact that there is some gap between the sprocket tooth 12a and the perforation hole $24_1$. Therefore, the probability of recording stabilized images on the film will be considerably increased by the provision of the resilient braking member 29.

Such a procedure for each exposure repeats itself so long as the shutter release button is depressed until all of the exposures in the series have been terminated.

In FIG. 4, there is shown embodiment which is substantially unchanged from the embodiment of FIGS. 2 and 3, but is provided with film detecting means in combination with a braking circuit for the magazine side take up spool driving motor 13. The film detecting means, in this instance, is constructed in the form of a switch 33 with its movable contact being positioned adjacent the film path on the opposite side to the resilient frictional member 29 in alignment therewith, so that when the length of a slack which occurs between the sprocket 12 and the magazine side take up spool 22 as the film 24 is advanced from sprocket 12 has reached or exceeded a predetermined level, the movable contact is brought into contact with the fixed contact of switch 33, thereby switch 33 is closed.

The switch 33 is connected in the power supply circuit for motor 13 in series with switch $Sw_1$, and the winding of motor 13 is connected through a braking circuit BK to the power supply circuit. With this arrangement, it is possible to further improve the stabilization of the film 24 against a residual movement which would be otherwise caused to occur during exposure by an increased momentum of take up spool 22 as the film is transported from supply spool 31 to take up spool 22 with ever increasing diameters of the film coil on the take up spool 22, in such a manner that when the sprocket 12 is stopped, the film 24 is taken out of contact with the movable contact of switch 33 to open switch 33, and then the take up spool 22 is abruptly decelerated by motor 13 due to generation of back electromotive force, for example.

Figure 5:
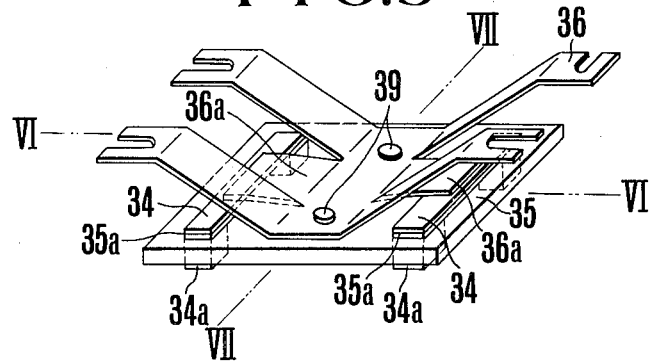
FIG. 5 is a perspective view of a film presser plate adapted for use in assisting the stabilization against residual movement of the film behind an exposure aperture of the camera with the magazine of FIG. 1.
Figure 6:
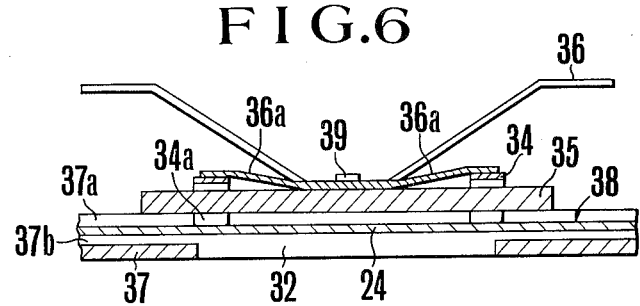
FIG. 6 is a sectional view of the film presser plate of FIG. 5 taken along a line VI—VI.
Figure 7:
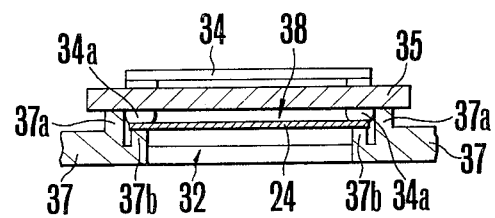
FIG. 7 is a similar view taken along a line VII—VII in FIG. 5.

For assisting is stabilizing the film 24 behind the exposure aperture 32 and the flatness of the film during exposure, there is provided a spring-biased film presser plate of such a construction as shown in FIGS. 5, 6 and 7, wherein FIG. 6 shows a longitudinal section of the presser plate 35 with respect to the film path, and FIG. 7 shows a traverse section of the presser plate 35. As shown in FIG. 7, the exposure aperture plate 37 is provided with a pair of film abutment rails 37a parallel to each other and with a pair of parallel film bearing rails 37b, the construction and arrangement of these rails 37a and 37b being well known in the art. The presser plate 35 is mounted through a spring member 36 by means of a pair of rivets 39 on a not shown hinged back cover of the film magazine chamber, and is arranged, upon closure of the back cover, to form a film channel behind the exposure aperture 32 together with the film abutment rails 37a. In order that the film 24 bears against the film bearing surfaces of rails 37b, there is provided four probes 34a of rectangular cross-section slidably fitting in respective rectangular holes 35a provided through the plate 35, and the probes 34a biased by a pair of spring arms 36a extending from the spring 36 through respective spring force transmitting plates 34 to urge the film 24 for sliding engagement with the bearing surface of rails 37b, whereby the film behind the exposure aperture is prevented from being curved and accidentally slippped.

It will be seen from the foregoing description that the described embodiments of the present invention accomplish the above mentioned objects by providing a film guiding and braking means as arranged between the camera side take up spool and the film path and between the film advancing sprocket and the magazine side take up spool to facilitate the stabilization of film transport past the exposure aperture to the take up spool in making a continuous series of exposures not only at a usual frequency but also at a considerably high frequency. Because of the shielding of the film from the camera side take up spool, film damage is considerably reduced. Further the provision of the film detecting means gives an additional advantage of reducing the consumption of electrical energy of the power source for the take up spool driving motor which would be otherwise necessary in the prior art.

What is claimed is :

1. In a roll film camera including a camera body, an aperture plate having an exposure aperture therein located in said camera body, a long length film magazine including a magazine chamber removably combined with said camera body, wherein the improvement comprises a, transport driving and braking apparatus comprising, in combination:
   a. a film supply shaft including shaft including a supply spool and a take up spool drive shaft including a take up spool each rotatable in the chamber of said magazine and positioned on the opposite sides of said exposure aperture for transporting film past said exposure aperture from the supply spool to the take up spool;
   b. first driving means positioned in said magazine and connected to said take up spool drive shaft;
   c. film advancing means positioned in said camera body for intermittently advacing said film past said exposure aperture, said film advancing means including a film advancing sprocket;
   d. a take up spool located in said camera body between said film advancing sprocket and said take up spool in said magazine chamber, said take up spool in said camera body spaced from the path of the film between said film advancing sprocket and said take up spool in said magazine chamber;
   e. second driving means positioned in said camera and operatively connected to said film advancing means; and
   f. film guiding and braking means having a film guiding portion arranged between said take up spool in said camera body and the path of said film between said film advancing sprocket and said take up spool in said magazine chamber and having a frictional resilient portion arranged between said take up spool in said magazine chamber and said advancing sprocket, so that when said film advancing means is stopped while said first driving means is driving said take up spool drive shaft, said film is brought into frictional engagement with said frictional portion, whereby said film is braked so as not to impart any residual movement to the film behind said exposure aperture during exposure operation of said camera.

2. In a roll film camera according to claim 1, which further comprises film detecting means positioned adjacent said film guiding and braking means on the opposite side of the film path from said frictional portion thereof so that upon the detection of the position of said film said film detecting means controls the operation of said first driving means.

3. In a roll film camera according to claim 1, which further comprises parallel film bearing surfaces on said aperture plate, spring-biased film pressing means positioned on the opposite side of said film from and in alignment with said exposure aperture for urging said film into sliding engagement against the parallel film bearing surfaces of said aperture plate of said camera.

4. In a roll film camera according to claim 1, wherein a slip mechanism is operatively associated with and located between said film take up spool drive shaft and said driving means for transmitting the driving action from said first driving means to said film take up spool drive shaft.

5. In a roll film camera according to claim 2, including a driving circuit for said first driving means, said driving circuit having a switch therein positioned adjacent said film guiding and braking means, said switch located on the opposite side of the path of the film from said frictional portion, said switch being arranged to be closed by the looping action of the film when both said film advancing means and said film take up spool are in operation and said switch being opened when said film advancing means stops for stopping said first driving means.

* * * * *

UNITED STATES PATENT OFFICE
CERTIFICATE OF CORRECTION

Patent No. 4,034,388  Dated July 5, 1977

Inventor(s) Tomonori Iwashita et al

It is certified that error appears in the above-identified patent and that said Letters Patent are hereby corrected as shown below:

In the heading of the patent [30] should read as follows:

--[30] Foreign Application Priority Data

June 7, 1974  Japan......49-64708
June 20,1974  Japan......49-70696--.

Signed and Sealed this

Twentieth Day of September 1977

[SEAL]

Attest:

RUTH C. MASON
Attesting Officer

LUTRELLE F. PARKER
Acting Commissioner of Patents and Trademarks